United States Patent

[11] 3,590,938

| [72] | Inventor | I. Macit Gurol |
| | | Farmington, Mich. |
| [21] | Appl. No. | 826,470 |
| [22] | Filed | May 21, 1969 |
| [45] | Patented | July 6, 1971 |
| [73] | Assignee | GSE Incorporated |
| | | Detroit, Mich. |

[54] VEHICLE SPEED CONTROL SYSTEM
32 Claims, 5 Drawing Figs.

[52] U.S. Cl................................................. 180/108,
180/109, 123/103, 137/47
[51] Int. Cl............................................................ B60k 31/00
[50] Field of Search............................................ 180/105-
—109; 123/103, 102; 137/47, 56, 57

[56] References Cited
UNITED STATES PATENTS

| 2,679,240 | 5/1924 | Ong et al. .................... | 123/103 |
| 3,183,993 | 5/1965 | Parker et al. ................. | 123/103 X |
| 3,339,664 | 9/1967 | Beveridge et al. ............ | 123/103 X |
| 3,340,952 | 9/1967 | Day............................... | 180/108 |
| 3,441,104 | 4/1969 | Hagler........................... | 180/108 |
| 3,504,754 | 4/1970 | Marie............................ | 180/108 |

*Primary Examiner*—Kenneth H. Betts
*Attorney*—Barnard, McGlynn & Reising

ABSTRACT: An automotive speed control system including a fluid pressure modulator and a throttle actuator responsive to pressure variations in the modulator to control throttle setting. The modulator includes a housing communicating with a subatmospheric pressure source through a fluid conduit and communicating with atmospheric pressure through a primary opening. A value valve element rotatable to a position representing indicated vehicle speed drives a memory disc carrying the fluid conduit to a corresponding position. At the desired speed, the memory disc is fixed in position and the primary opening is closed. Rotation of the valve element relative to the fluid conduit thereafter modulates pressure in the housing and controls the throttle actuator.

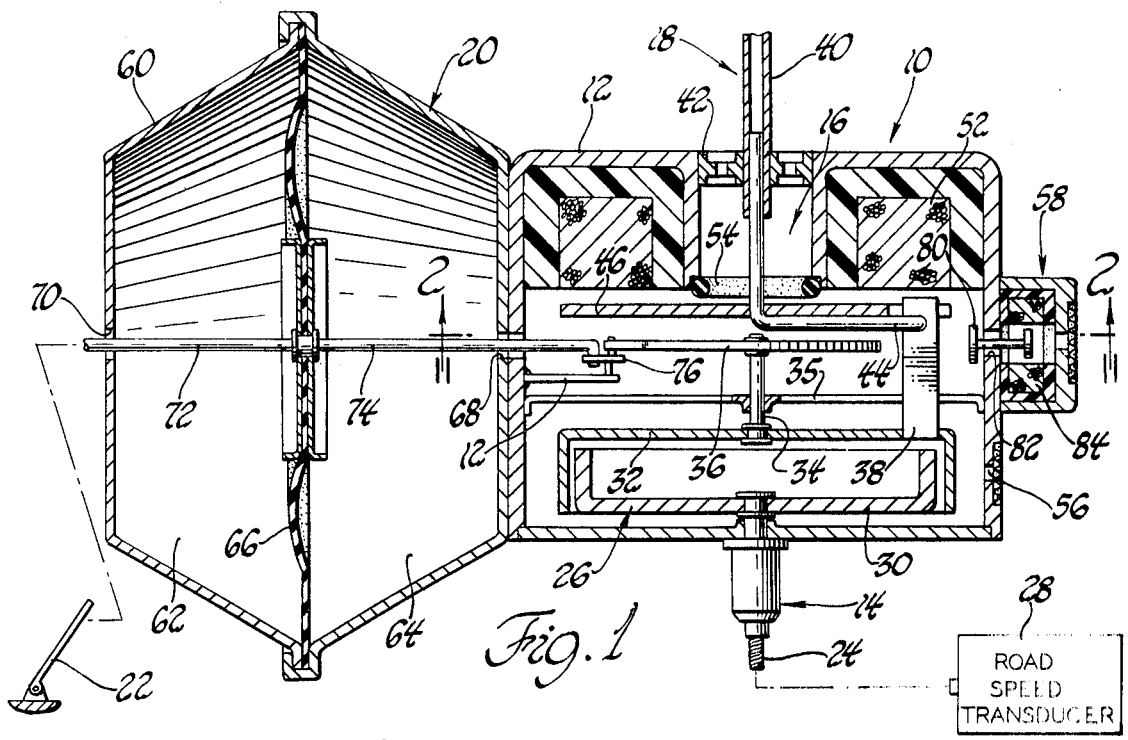

VEHICLE SPEED CONTROL SYSTEM

This invention relates to speed control systems of the type used to maintain an automobile at a constant speed under varying road load conditions.

Vehicle speed control systems, commonly known as cruise control systems, are currently a popular accessory item in automotive vehicles. Such systems generally employ a servomechanism for comparing indicated vehicle speed with a predetermined speed reference quantity and for producing an error quantity which operates a throttle control device to maintain the indicated speed as nearly equal to the reference speed as possible. In practice, such systems generally employ a fluid pressure modulator for regulating the pressure applied to a throttle actuator device.

In accordance with the invention, an improved fluid pressure modulator for use in automotive speed control systems is provided. The subject fluid pressure modulator is of simple construction and employs only a small number of parts all of which may be easily fabricated and assembled. Moreover, the modulator requires no calibration after assembly and installation. In general, this is accomplished by a fluid pressure modulator design in which a regulable-flow fluid conduit is, in one condition, continuously positioned within a housing along with the input member which is positioned according to indicated speed, but which upon initiation of system operation becomes fixed in position relative to the housing such that the fluid flow therethrough is thereafter continuously modulated in accordance with the position of the input member.

In accordance with a specific form of the invention, initiation of system operation of control speed is accomplished simply by arriving at the desired speed and energizing the system. This is accomplished by means of a modulator device in which the operation of a latching mechanism, such as an electromagnet, fixes the modulated fluid conduit position according to currently indicated speed, and closes a primary opening in a modulator housing to begin the fluid pressure modulation function.

In a preferred form of the invention, feedback is provided in a closed-loop servosystem to improve system response and stability. In general, this is accomplished by a feedback connection between a throttle position actuator and a biasing mechanism associated with the variably positioned input member thereby to vary the bias on the member or associated elements in relation to throttle position.

The preferred form of the invention also permits prompt and easily effected resumption of driver speed control without the loss of desired speed information. In general, this is accomplished by means of a secondary opening in the modulator housing having a selectively controlled valve which permits the opening of the housing to atmospheric pressure thereby to promptly relieve the subatmospheric pressure conditions normally existing in the modulator housing during the speed control mode.

Further features and advantages of the present invention will become apparent upon reading of the following specification which describes an illustrative embodiment to the invention. This description is to be taken with the accompanying figures of which:

FIG. 1 is a side view, in cross section, of a modulator and actuator assembly embodying the invention;

FIG. 2 is a plan view of a portion of the FIG. 1 apparatus;

FIG. 3 is an exploded perspective view of parts from the FIG. 1 apparatus;

FIG. 4 is a schematic diagram of an electrical circuit for the FIG. 1 apparatus; and, FIG. 5 illustrates a preferred driver control button for controlling the electrical circuit of FIG. 4. Referring to FIG. 1, a speed control system for automotive vehicles is shown to include a fluid pressure modulator 10 and a pressure-controlled throttle actuator 20. Modulator 10 comprises a housing 12 having an indicated speed input 14, a primary opening 16 communicating with fluid at atmospheric pressure, and an input fluid conduit 18 communicating with fluid at subatmospheric pressure. Modulator 10 functions to control the pressure of fluid within the chamber defined by housing 12 between atmospheric and subatmospheric limits to control throttle actuator 20 in such a manner as to maintain the indicated speed as nearly equal as possible to a desired speed setting regardless of road load conditions. Actuator 20 is connected accordingly to a throttle control element 22 such as an accelerator pedal.

Indicated speed input 14 includes a flexible cable 24 having one end connected to a modified speedometer drag cup assembly 26 and the other end connected to a road speed transducer 28 of the type commonly associated with an automotive speedometer. Transducer 28 is also preferably connected to a speedometer, not shown, to provide an indicated speed reading. Assembly 26 includes a cup-shaped permanent magnet rotor 30 which is connected to be rotated by the flexible cable 24 in a continuous fashion. Coaxially disposed about magnet 30 is a speed cup 32 mounted on shaft 34 for limited rotation about the axis of shaft 34 which is supported within the housing 12 by a spider-type hub 35. To limit the angular rotation of speed cup 32 a flat wound torsion spring 36 has the inner end thereof connected to shaft 34 and the outer end thereof connected to housing 12 as best shown in FIG. 2. Accordingly, speed cup 32 assumes an angular position within housing 12 which is related to indicated function speed. Speed cup 32 carries a flapper valve 38 which extends in the axial direction within housing 12. Flapper valve 38 as shown in FIG. 2 is formed by making a three-sided cut through the surface of speed cup 32 and erecting the rectangular cutout portion to an upright and substantially radially extending position. Forming valve 38 out of the surface of cup 32 tends to maintain the dynamic balance condition of speed cup 32 for rotation about the axis of shaft 34. Flapper valve 38 cooperates with the end portion of fluid conduit 18 to perform a valving junction and modulate pressure in housing 12 as is hereinafter described in detail.

Fluid conduit 18 comprises an outer portion 40 which is nonrotatively fixed within the primary opening 16 by means of a spider-type plug 42 having a plurality of passages into opening 16, and a rotatable end portion 44 which sealingly and rotatably rides within the outer portion 40. The end portion 44 of fluid conduit 18 extends axially into the chamber of housing 12 through a central aperture in a memory disc 46, thence radially to a point adjacent the periphery of disc 46 and thence circumferentially into the projected area of a notched-out portion 48 in memory disc 46 as best shown in FIG. 2. The end portion 44 of fluid conduit 18 includes an orifice 50 which is disposed within the notched-out portion 48 of memory disc 46. End portion 44 may be suitably bonded to disc 46 such that the combination rotates together within housing 12. The fixed portion 40 of fluid conduit 18 is connected to a source of subatmospheric fluid pressure such as an automotive intake manifold.

As best shown in FIGS. 1 and 2, the flapper valve 38 extends axially into the notched-out portion 48 of memory disc 46 such that the plane surface of flapper valve 38 is adjacent and parallel to the end plane of the conduit portion 44 surrounding orifice 50. Accordingly, rotation of speed cup 32 in a counterclockwise direction with reference to FIG. 2 tends to urge the flapper valve 38 against the orifice 50 and rotation in the clockwise direction tends to urge the flapper valve 38 against the edge of the notched-out portion 48 of memory disc 46. As long as memory disc 46 and the end portion 44 of conduit 18 are free to rotate about the longitudinal axis of housing 12, the upstanding flapper valve 38 carries the memory disc 46 and the end portion 44 of fluid conduit 18 along with the speed cup 32 to assume an angular position which corresponds to the angular position of the speed cup 32. The notched-out portion 48 compensates for the weight of end portion 44 in preserving the dynamic balance of disc 46.

Secured in the housing 12 adjacent the end wall thereof and surrounding the primary opening 16 is an electromagnet 52 which operates to control the axial position of memory disc 46 within the housing 12 relative to an annular sealing ring 54 which is disposed about the inner periphery of the axially extending primary opening 16 as shown in FIG. 1. When electromagnet 52 is suitably energized by means of the circuitry shown in FIG. 4, the magnetic force of attraction produced thereby tends to displace memory disc 46 into contact with the sealing ring 54 thereby to close the primary opening 16. Disc 46 is accordingly constructed wholly or partially of a paramagnetic material. In the closed condition of housing 12, a small amount of fluid at atmospheric pressure is admitted into the chamber through a small secondary opening 56 which may be provided with a suitable filtering screen to prevent the ingestion of foreign particles into the chamber of housing 12. In addition, housing 12 is provided with a selectively operable valve 58 which includes a valve element 80 which opens and closes a port 82 under the control of an electromagnetic coil 84. Port 82 is normally closed, but may be opened to quickly restore atmospheric pressure conditions to the chamber of housing 12.

Throttle actuator 20 comprises a housing 60 which may be suitably connected to the housing 12 of modulator 10 to provide a unitary assembly. Housing 60 is effectively divided into two chambers 62 and 64 by a disc-type diaphragm 66. Chamber 64 is in fluid pressure communication with the chamber of housing 12 by way of a mutual passage 68. Chamber 62 is in fluid communication with atmospheric pressure through a port 70. Therefore, variations in pressure within chamber 64 cause the diaphragm 66 to be displaced axially within housing 60.

Diaphragm 66 is centrally connected to an actuator rod 72 which in turn is mechanically connected to the throttle control element 22 in any suitable manner. Accordingly, the position of throttle element 22 and the speed of the vehicle is determined, during operation of the system, by the pressure variations within the modulator housing 12. It will be understood that the actuator rod 72 may alternatively be directly connected to the carburetor throttle linkage.

Referring to FIGS. 1 and 3, the central portion of the diaphragm 66 which carries the actuator rod 72 is mechanically connected by means of a relatively rigid feedback rod 74 to the outer end portion of the torsion spring 36. A pivot link 76 provides a mechanical connection between feedback rod 74 and spring 36 and anchors the parts to the housing 12 as shown in FIGS. 1 and 3. Feedback rod 74 functions to displace the end portion of spring 36 in accordance with the position of diaphragm 66 to introduce a negative feedback quantity into the closed-loop mechanism of the subject device thereby to enhance the response and stability of the system in a manner to be further described hereinafter. The feedback rod 74 conveniently extends through the passage 68 between the housings 12 and 60. It is to be understood that in an embodiment wherein the housings 12 and 60 are remote from one another, the feedback rod 74 may take the form of a Bowden wire and may follow any convenient route but preferably is contained within the fluid communication means extending between the housings 12 and 60.

FIG. 4 illustrates an electrical circuit which may be employed to provide driver control over the operation of the various elements described above. The circuit includes a DC voltage source 86, such as a 12v. automotive battery, connected through the series combination of a fuse 88, a main on-off switch 90 and a pushbutton switch 92 to parallel circuit legs 94 and 96 which terminate at ground as indicated.

Circuit leg 94 includes the series combination of a second pushbutton switch 98 and the coil 52' of electromagnet 52 illustrated in FIG. 1. Additionally, a pair of magnetically controlled contacts 100 are connected in shunt relationship with switch 98 such that energization of coil 52' closes contacts 100 to form a holding circuit in the well-known manner.

Circuit leg 96 includes the series combination of a third pushbutton switch 102, the coil 84' of electromagnet 84 shown in FIG. 1, and a normally closed brake pedal switch 104. Additionally, a pair of magnetically controlled contacts 106 are connected in shunt relationship with switch 102 such that energization of coil 84' closes the contacts 106 to form a holding circuit in the well-known manner.

FIG. 5 illustrates a preferred arrangement of the pushbutton switches 92, 98, and 104 in a single control button assembly 108. The assembly 108 includes a pushbutton 110 for displacing contacts 112, 114, and 116 which are associated with switches 92, 98, and 104, respectively. The contacts 112, 114, and 116 engage stationary contacts 118, 120, and 122, respectively, to complete the switch circuits shown in FIG. 4. Contact 118 is constructed to have a long stroke so that it engages contact 112 in the normal condition of pushbutton 110 whereas partial depression of the pushbutton is required to engage contacts 120 and 122 with corresponding contacts 114 and 116, respectively. In addition, pushbutton 110 is depressible to the extent of driving contacts 112, 114, and 116 beyond engagement with contacts 118, 120, and 122, respectively, for purposes to be described. Pushbutton 110 may be spring loaded to return to the position illustrated when no pressure is applied thereto.

It will be understood that he circuitry of FIGS. 4 and 5 are illustrative of only one of several control schemes which may be employed with the apparatus of FIGS. 1 through 3.

OPERATION

In operation, the flexible cable 24 rotates the magnet 30 in proportion to the indicated speed of the vehicle to which the subject system is connected. Speed cup 32 rotates through a limited angle against the bias of torsion spring 36 to assume an angular position related to the indicated speed. Flapper valve 38 carries the memory disc 46 and the end portion 44 of subatmospheric pressure fluid conduit 18 in the angular direction of rotation such that the memory disc 46 assumes substantially the same angular position as the speed cup 32. Switch 90 is assumed to be in the open circuit condition such that no current flows through coil 52' of electromagnet 52. Memory disc 46 is thus axially displaced away from the annular sealing ring 54 to admit air at atmospheric pressure to the chamber of housing 12. The substantially atmospheric pressure within the chamber of housing 12 is communicated through passage 68 to the chamber 64 of the actuator 20. Since atmospheric pressure exists on both sides of diaphragm 66, no force is applied thereto. The vehicle throttle setting is thus determined by foot pressure on the accelerator pedal 22 in the normal fashion.

To energize the subject system, switch 90 is closed and pushbutton 110 is depressed to engage contacts 114 and 120 closing switch 98 when the vehicle arrives at the desired speed to energize coil 52' and close holding contacts 100. Coil 52' displaces memory disc 46 into sealing engagement with ring 54 thereby closing the primary opening 16 and fixing the memory disc 46 and the end portion 44 of fluid conduit 18 in an angular position representing the indicated speed at the time the switch 90 was closed. With primary opening 16 closed, flow through conduit 18 from the chamber of housing 12 quickly creates subatmospheric pressure condition within the chamber of housing 12 and also within the pressure chamber 64 of actuator housing 60. The unequal pressure conditions in actuator chambers 62 an 64 cause diaphragm 66 to be displaced toward the decreased pressure chamber 64. Rod 72 carries throttle control element 22 to the desired speed setting and regulates the position of element 22 thereafter.

Should vehicle speed increase, speed cup 32 rotates flapper valve 38 toward the orifice 50 of fluid conduit end portion 44 tending to close the orifice. This produces a pressure increase in the housing 12 which is communicated to the actuator diaphragm 66 to relieve depressing force on the throttle control element 22 thereby permitting the vehicle to slow down.

Should the vehicle speed decrease due to an uphill road condition, for example, speed cup 32 assumes a new angular position causing the flapper valve 38 to rotate away from the orifice 50 of fluid conduit end portion 44. Under this condition orifice 50 is opened and the pressure within housing 12 rapidly decreases thereby displacing diaphragm 66 in a direction to further depress the throttle control element 22. The feedback link 74 is arranged such that displacement of diaphragm 66 in the direction tending to open the vehicle throttle rotates torsion spring 36 in a direction which produces the effect of a speed increase by positioning speed cup 32 accordingly. This tends to close the vehicle throttle thereby introducing a negative feedback quantity.

Displacing pushbutton 110 to close switch 98 also closes switch 102 through contacts 116 and 122. Closing switch 102 closes holding circuit contacts 106 so that circuit legs 94 and 96 remain energized when the pushbutton 110 is allowed to return to the position illustrated in FIG. 5. At this condition, pressure on the vehicle brake pedal opens normally closed contacts 104 to break the current flow through circuit leg 96 only. Deenergization of coil 84′ permits valve element 84 to unseat and open port 82, admitting air at atmospheric pressure into housing 12. This relieves the controlling bias on the diaphragm 66 restoring normal throttle control to the driver. However, since circuit leg 94 is unaffected, current continues to flow through coil 52′ and therefore disc 46 is retained in the desired speed position. To resume the desired speed following opening of brake pedal switch 104, it is necessary only to partially depress pushbutton 110 to reengage contacts 116 and 122 to close switch 102.

If a new speed setting is desired, the driver may fully depress pushbutton 110 to break the circuits through all of switches 92, 98, and 102. This deenergizes both coils 52′ and 84′ and frees the memory disc 46 to rotate with speed cup 32 once more. After the new speed is reached, the pushbutton 110 is released to return to the illustrated position. In returning to this position, contacts 114 and 116 momentarily engage contacts 120 and 122, respectively, to close switches 98 and 102. This restores the flow of current through coil 52′ to again seat disc 46 against ring 54 and close valve 58. Speed control is then resumed in the fashion described above.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that with the scope of the appended claims, the invention may be practiced otherwise than as specifically described.

The embodiments of the invention in which I claim an exclusive property or privilege are defined as follows:

1. Apparatus for controlling vehicle speed comprising: a housing defining a chamber having a primary opening communication with fluid of a first pressure, an input element rotatably disposed within the chamber, means for angularly displacing the input element in accordance with vehicle speed, a memory element rotatably disposed within the chamber and rotatable with the input element, means for fixing the memory element in a given angular position and closing the primary opening, a fluid conduit having an end portion carried by the memory element and connectable to a fluid of a second pressure, an orifice in the end portion of the conduit, valve means for opening and closing the orifice in accordance with the angular position of the input element to modulate the pressure in the chamber between the first and second pressures, and, actuator means responsive to the pressure in the chamber for actuating a speed regulator element.

2. Apparatus as defined in claim 1 wherein said input element is a speed cup and said means for displacing the input element is a permanent magnet magnetically coupled to the speed cup and rotated at an angular rate proportional to indicated vehicle speed, the apparatus further including spring means disposed within the chamber and connected to bias the input element in a direction opposite to the direction of rotation thereof.

3. Apparatus as defined in claim 1 wherein the memory element comprises a disc rotatably mounted within the chamber adjacent the primary opening and axially displaceable into sealing engagement with the primary opening upon operation of said means for fixing the memory element in a given angular position.

4. Apparatus as described in claim 3 including sealing means disposed on the housing about the primary opening and cooperating with the memory element to seal the primary opening, and a secondary opening in the housing for admitting relatively small quantities of fluid at the first pressure.

5. Apparatus as described in claim 4 wherein the fluid conduit includes a portion extending through the primary opening and a portion carrying said orifice radially disposed away from the primary opening thereby to rotate the orifice in accordance with rotation of the memory element.

6. Apparatus as defined in claim 4 wherein the means for fixing the memory element in a given angular position includes an electromagnet disposed at least partially within the housing and energizable to displace the memory element into contact with the sealing means.

7. Apparatus as defined in claim 6 including selectively operable circuit means for energizing the electromagnet.

8. Apparatus as defined in claim 1 wherein the first pressure is substantially atmospheric and the second pressure is subatmospheric.

9. Apparatus as defined in claim 5 wherein the valve means includes an upstanding tab formed out of the surface of the input element and extending axially toward and adjacent the orifice whereby rotation of the input element relative to the memory element rotates the tab relative to the orifice.

10. Apparatus as defined in claim 9 wherein the memory element is a disc having a notched portion in the periphery thereof, the valve means having a portion disposed within the notched portion, the fluid conduit extending to the notched portion such that the orifice is adjacent the valve means to be regulated thereby.

11. Apparatus as defined in claim 10 including selectively operable additional valve means for introducing air at atmospheric pressure into the housing.

12. Apparatus as defined in claim 11 including means for maintaining said selectively operable valve means in the closed position but responsive to the operation of a vehicle brake pedal to open the valve.

13. Apparatus as defined in claim 1 wherein the actuator means includes a housing having a chamber in fluid pressure communication with the chamber and a diaphragm secured within the housing for displacement in accordance with fluid pressure conditions acting thereon.

14. Apparatus as defined in claim 13 including feedback means connected between the actuator diaphragm and the input element.

15. Apparatus as defined in claim 14 wherein the feedback means comprises a relatively rigid member operatively connected between the actuator diaphragm and the input element.

16. Apparatus as defined in claim 15 wherein the modulator housing and the actuator housing are connected together to form a unitary assembly.

17. A modulator for use in vehicle speed control systems comprising: a housing defining a chamber, a fluid conduit having an end portion within the chamber, an orifice formed in the end portion and input means including an element mounted for rotation within the chamber through an angle proportional to vehicle indicated speed, a valve element carried by said element adjacent the orifice and displaceable within the chamber to various positions representing various speeds, means carrying the conduit and being normally displaceable with the valve element but selectively maintainable in a given position relative to the housing.

18. Apparatus as defined in claim 17 including an opening in the housing which communicates with fluid at atmospheric pressure, and the fluid conduit communicates with fluid at subatmospheric pressure.

19. Apparatus as defined in claim 18 wherein said placeable means within the chamber is selectively operable to close the opening.

20. Apparatus as defined in claim 19 including an electromagnet selectively energizable for displacing the displaceable means.

21. Apparatus as defined in claim 20 wherein the displaceable means is a disc mounted for rotation about an axis of the housing, the disc carrying the end portion of the fluid conduit within the chamber for displacement therewith.

22. Apparatus as defined in claim 21 wherein the fluid conduit enters the housing through the opening.

23. Apparatus as defined in claim 22 wherein the fluid conduit includes a portion extending along said axis and through the disc and a portion extending radially along the disc and terminating at the orifice.

24. Apparatus as defined in claim 23 including sealing means disposed about the opening for engagement with the disc, and a secondary opening through the housing to the chamber and communicating with fluid at atmospheric pressure.

25. Apparatus as defined in claim 24 wherein the input means includes a permanent magnet mounted for rotation within the chamber at speeds proportional to vehicle indicated speed, and a speed cup carrying the valve element and magnetically coupled to the magnet to be rotated thereby, and spring means for limiting the displacement of the speed cup.

26. Apparatus as defined in claim 25 wherein the disc includes a notched-out portion adjacent the periphery, the valve element extending into the notched-out portion and adjacent the orifice whereby relative displacement of the valve element and the disc tends to regulate flow through the orifice.

27. Apparatus as defined in claim 26 wherein the valve element is formed out of the upper surface of the speed cup.

28. Apparatus as defined in claim 27 including additional selectively operable valve means in the housing having a normally closed condition but selectively openable to admit fluid at atmospheric pressure to the chamber.

29. Apparatus as defined in claim 28 including means for varying the bias applied by said spring means to the speed cup.

30. Apparatus as defined in claim 28 including electrical circuit means for energizing the electromagnet.

31. Apparatus as defined in claim 30 wherein the circuit means includes a voltage source, first selectively operable switch means connecting the source to the electromagnet, a second electromagnet for controlling the additional valve means, and second selectively operable switch means connecting the source to the second electromagnet.

32. Apparatus as defined in claim 31 including means for interrupting current flow through the second electromagnet in response to operation of the vehicle brakes to open the additional valve means.